United States Patent [19]

Brown et al.

[11] Patent Number: 5,423,006

[45] Date of Patent: Jun. 6, 1995

[54] NOTIFICATION AND VERIFICATION OF STATE CHANGES IN A DATA PROCESSING INPUT/OUTPUT SYSTEM

[75] Inventors: Paul J. Brown, Poughkeepsie; Joseph C. Elliott, Hopewell Junction; Karl H. Hoppe, Ulster Park; Kenneth R. Lynch, Rhinebeck, all of N.Y.; Martin W. Sachs, Westport, Conn.

[73] Assignee: International Business Machines Corporation, Armonk, N.Y.

[21] Appl. No.: 86,390

[22] Filed: Jun. 30, 1993

Related U.S. Application Data

[63] Continuation of Ser. No. 576,569, Aug. 31, 1990, abandoned.

[51] Int. Cl.⁶ .................................................. H04J 3/24
[52] U.S. Cl. .................................. 395/275; 370/94.3; 370/60
[58] Field of Search ............. 395/200; 370/58.1, 94.1, 370/94.3, 58.1, 94.1, 94.3, 60

[56] References Cited

U.S. PATENT DOCUMENTS

| | | | |
|---|---|---|---|
| 4,074,142 | 2/1978 | Jackson | 250/551 |
| 4,225,818 | 9/1980 | Beadle et al. | 324/302 |
| 4,257,100 | 3/1981 | Syrbe et al. | 395/575 |
| 4,363,093 | 12/1982 | Davis | 395/200 |
| 4,490,785 | 12/1984 | Strecker et al. | 395/325 |
| 4,494,241 | 1/1985 | Mayoux | 375/76 |
| 4,551,718 | 11/1985 | Cookson et al. | 340/825.16 |
| 4,562,533 | 12/1985 | Hodel et al. | 395/200 |
| 4,601,035 | 7/1986 | Marzec et al. | 371/32 |
| 4,605,928 | 8/1986 | Georgiou | 340/827 |
| 4,630,045 | 12/1986 | Georgiou | 340/825.79 |
| 4,635,250 | 1/1987 | Georgiou | 370/65.5 |
| 4,641,302 | 2/1987 | Miller | 370/60 |
| 4,654,784 | 3/1987 | Campanini | 395/325 |
| 4,692,917 | 9/1987 | Fujioka | 370/60 |
| 4,703,487 | 10/1987 | Haselton et al. | 372/33 |
| 4,771,419 | 9/1988 | Graves et al. | 370/60 X |
| 4,914,583 | 4/1990 | Weisshaar | 395/200 |
| 5,088,091 | 2/1992 | Schroeder et al. | 370/94.1 X |
| 5,123,089 | 6/1992 | Beilinski et al. | 395/200 |
| 5,138,615 | 8/1992 | Lamport et al. | 370/94.3 |
| 5,140,583 | 8/1992 | May et al. | 370/60 |
| 5,179,558 | 1/1993 | Thacker et al. | 370/94.3 |

OTHER PUBLICATIONS

IBM Technical Disclosure Bulletin, vol. 27, No. 8, Jan. 1985, pp. 4690–4692, "Parallel Interface Switching Mechanism".

*Primary Examiner*—Jack B. Harvey
*Assistant Examiner*—Paul R. Myers
*Attorney, Agent, or Firm*—Bernard M. Goldman

[57] ABSTRACT

A computer I/O system which includes a dynamic switch having a plurality of ports and a plurality of link-level facilities, with each link-level facility being attached to an individual one of the ports. Whenever the state of a port or its attached link-level facility is changed in such a way that the attached link-level facility's ability to communicate with another link-level facility might be affected, this fact is recognized by a dynamic switch control unit which causes a state change notification (SCN) frame to be transmitted to all other link-level facilities which might be affected. The link-level facilities receiving such a state change notification then determine if any of the associations or potential associations with the link-level facility which caused the state change notification are affected.

23 Claims, 6 Drawing Sheets

NOTIFICATION AND VERIFICATION OF STATE CHANGES IN A DATA PROCESSING INPUT/OUTPUT SYSTEM

This is a continuation of application Ser. No. 07/576,569 filed on Aug. 31, 1990, now abandoned.

BACKGROUND OF THE INVENTION

The present invention is related to a data processing system having input/output channels, control units each for controlling peripheral devices, and a dynamic switch between the channels and the control units, and is more particularly related to reporting state changes through the dynamic switch from particular ones of the control units to the channels or from particular ones of the channels to the control units.

Various switches such as cross-point switches are known for establishing connections between data lines. Such switches are useful in establishing point-to-point connections between an input/output (I/O) channel of a data processing system and an I/O peripheral device or control unit.

Georgiou, Parallel Interface Switching Mechanism, pp 4690–4692, IBM Technical Disclosure Bulletin, Vol. 27, No. 8, Jan., 1985, discloses utilizing high-speed cross-point switching chips in multiple parallel interface switching mechanisms. A controller is referred to but not shown which is used to set up connections on the switching chips in order to establish paths between channels and control units.

U.S. Pat. No. 4,074,142 to Jackson for Optical Cross-Point Switch issued Feb. 14, 1978 and discloses an optical cross-point switch for connecting any of a multiplicity of input signals to any of a multiplicity of output lines. Electrical signals are converted to optical signals by light emitting diodes. The light from each light emitting diode is focused on photosensor means to convert the optical signals back to electrical signals. An input and output address decoding circuit selects one light emitting diode to be coupled to one photosensor to make a switch connection. The address information is transmitted to the optical switch via an address bus.

U.S. Pat. No. 4,562,533 to Hodel et al. for Data Communications System to System Adapter issued Dec. 31, 1985 and discloses a data processing system having a dynamic channel exchange and a plurality of central systems. Each of the central systems has at least one serial channel control processor. The dynamic channel exchange provides switching logic for permitting each of the plurality of central systems access to a plurality of peripherals coupled to the dynamic channel exchange. The data processing system further includes an adapter which is connected to the dynamic channel exchange for providing communications between any pair of central systems.

U.S. Pat. No. 4,605,928 to Georgiou for Fault-Tolerant Array of Cross-Point Switching Matrices issued Aug. 12, 1986 and discloses a cross-point switch in which it is possible to have bi-directional operation for allowing data flow in both directions.

U.S. Pat. No. 4,630,045 to Georgiou for Controller for a Cross-Point Switching Matrix issued Dec. 16, 1986 and discloses a switching matrix controller which interprets a request for connection or disconnection, determines if it is possible, selects a path through the matrix and sends control signals to the matrix to make the connection or disconnection. The status of the switching array is checked when making the connection or disconnection.

U.S. Pat. No. 4,635,250 to Georgiou for Full-Duplex One-Sided Cross-Point Switch issued Jan. 6, 1987 and discloses a one-sided cross-point switching chip which may be operated in a full duplex mode wherein the direction of information flow or electrical signals on the internal vertical lines or the interconnection lines can be in different directions, depending upon which external lines are to be interconnected.

U.S. Pat. No. 4,641,302 to Miller for High Speed Packet Switching Arrangement issued Feb. 3, 1987 and discloses a circuit arrangement for switching serial data packets through a network to one of a plurality of possible outgoing lines. The incoming serial data is in packets wherein each packet includes a header portion containing an address indicative of which one of a plurality of outgoing lines the data packet should be routed to.

U.S. Pat. No. 4,692,917 to Fujioka for Packet Switching System issued Sep. 8, 1987 and discloses a packet switching system having a packet handler for analyzing a header of each incoming packet and deciding the outgoing route of the packet. The packet also includes a packet closing flag which causes the packet handler to release the connection.

U.S. Pat. No. 4,703,487 to Haselton et al. for Burst-Switching Method for an Integrated Communications System issued Oct. 27, 1987 and U.S. Pat. No. 4,771,419 to Graves et al. for Method of and Switch for Switching Information issued Sep. 13, 1988. Both of these patents disclose switching networks for switching data wherein a header contains an address for making a connection and a termination character or characters for breaking the connection.

Systems are known in which the status of one element is sent to a remote location. U.S. Pat. No. 4,225,918 to Beadle et al for "System for Entering Information Into and Taking it From a Computer From a Remote Location" issued Sep. 30, 1980 and discloses a system for transmitting binary instruction or data words to or from a computer by control from a home base remote from the computer site. The system includes a special purpose microcomputer directly connected to the main computer console which returns to the home base a rapidly integrated and updated pulse train representative of the status of all console lights.

U.S. Pat. No. 4,257,100 to Syrbe et al for "Electronic Data Processing System for Real Time Data Processing" issued Mar. 17, 1981 and discloses an electronic data processing system having a ring bus. In the case of a fault, the operability of all bus line segments, each of which connects two neighboring stations, is tested by means of test messages. The bus line status is determined and reported to all stations still connected together.

U.S. Pat. No. 4,490,785 to Strecker et al for "Dual Path Bus Structure for Computer Interconnection" issued Dec. 25, 1984 and discloses a bus structure for use in a computer network wherein each host device in the network connects to the bus paths through a port. Path selection is carried out by the port which, when a path failure is detected, automatically switches to an alternate good path upon detection of the failure, all without host involvement.

U.S. Pat. No. 4,494,241 to Mayoux for "Installation For the Transmission of Information by an Optical Bus Line" issued Jan. 15, 1985 and discloses a bus line installation for the transmission of information between a plurality of transmitters and a plurality of receivers.

U.S. Pat. No. 4,551,718 to Cookson et al for "Method and Apparatus for Transmitting Status Information Between Remote Locations" issued Nov. 5, 1985 and discloses a system for transmitting status information from a first location to a remote second location and includes a monitoring device at the first location for monitoring the state of a plurality of relays or other devices that are capable of being in either an active or inactive state. A processor produces a first signal indicative of a change of state of any relay from the inactive to the active state.

U.S. Pat. No. 4,654,784 to Campanini for "Circuit Arrangement for Routing Signals Between a Master-Slave Pair of Controlling Processors and Several Master-Slave Pairs of Controlled Processing Units" issued Mar. 31, 1987 and discloses a plurality of switching modules in a telecommunication system wherein the switch modules switch to alternate links in the event of a malfunction.

SUMMARY OF THE INVENTION

The present invention is used in conjunction with a computer I/O system which includes a dynamic switch having a plurality of ports and a plurality of link-level facilities, with each link-level facility being attached to an individual one of the ports. Whenever the state of a port or its attached link-level facility is changed in such a way that the attached link-level facility's ability to communicate with another link-level facility might be affected, this fact is recognized by a dynamic-switch control unit which causes a state change notification (SCN) frame to be transmitted to all of the other link-level facilities which might be affected. The link-level facilities receiving such a state change notification then determine if any of the associations or potential associations with the link-level facility which caused the state change notification are affected.

It is therefore a primary object of the present invention to provide a means for making state change notifications to each link-level facility which might be affected by a change in state in a computer I/O system.

It is another object of the present invention to provide a dynamic-switch control unit in which a state change notification initiative is created by a change in state or a change in connectability of a link-level facility in a computer I/O system.

It is a further object of the present invention to provide a state change notification mechanism which provides for a state change notice being sent on behalf of a specific link-level facility in the event of:

1. a state change notice being received with a to-whom-it-may-concern destination address from that specific link-level facility;
2. the specific link-level facility has requested that it be assigned a link address during initialization time;
3. the port to which that specific link-level facility is attached has entered the link failure, off-line, or static state at a time when that link-level facility was identified by its own link address; and
4. The capability of making dynamic connections between two dynamic-switch ports, one of which is connected to that specific link-level facility, is altered.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
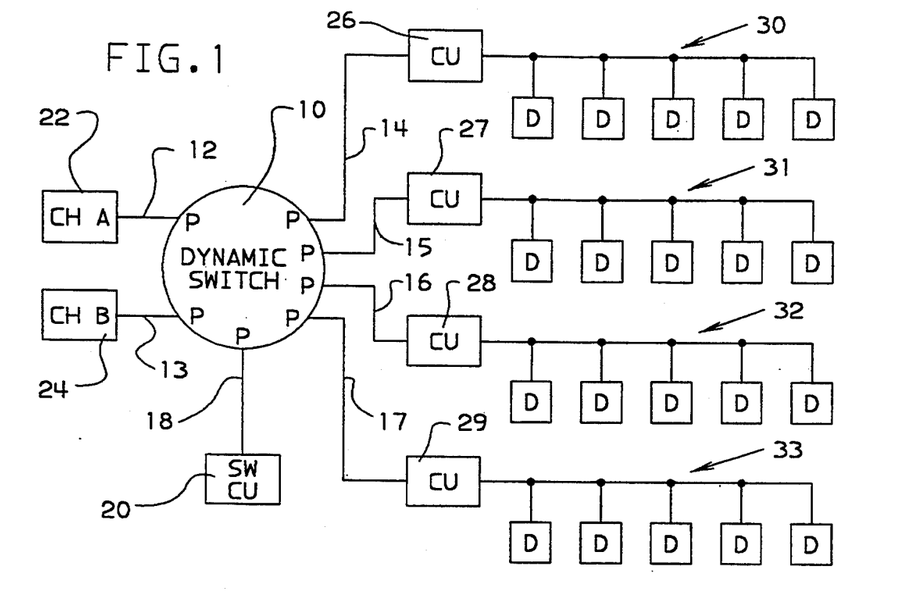
FIG. 1 is a block diagram of an I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P attached to one end of a plurality of links 12–18. One of the links 18 is attached to a dynamic-switch control unit 20, and each of the other links 12–17 is attached to either a channel, such as channel A designated 22 or channel B designated 24, or to one of the control units 26–29. Each of the control units 26–29 control a plurality 30–33 of peripheral devices D, respectively.

Each of the channels 22 and 24 is a single interface on a channel subsystem, such as, for instance, a System/370, 370-XA or ESA/370 channel subsystem. The channels 22 and 24 direct the transfer of information between I/O devices of the pluralities 30–33 of devices D and main storage (not shown) of the data processing system and provide the common controls for the attachment of different I/O devices D by means of a channel path (to be defined). The channels 22 and 24 are channels wherein data is transmitted and received in a format, as will be explained.

Each of the links 12–17 is a point-to-point pair of conductors that may physically interconnect a control unit and a channel, a channel and a dynamic switch (such as links 12 and 13), a control unit and a dynamic switch (such as links 14–17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in the aforementioned U.S. Pat. Nos. 4,605,928; 4,630,045; and 4,635,250, incorporated by reference herein. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic-switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in copending U.S. Pat. No. 5,107,489, issued Apr. 21, 1992, entitled "Switch and Its Protocol for Making Dynamic Connections".

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

In one embodiment, the dynamic switch 10 may have a maximum of 254 ports P. Since it takes two ports to make a connection, the maximum number of possible simultaneous connections is equal to half the number of ports P implemented. It will be understood that if the quantity of ports P is an odd number, then the maximum is half of the maximum number of ports P less one. A port P does not have a link address and, therefore, is not uniquely addressable. However, an association between a port P and either a destination link address or a source link address is provided by the dynamic switch, as will be explained. The dynamic switch 10 has a matrix controller, discussed herein in connection with FIG. 6, which contains the information used to make and break connections between the ports P.

The dynamic switch 10 has one dynamic-switch control unit 20, which is assigned the unique link address of its link 18. The dynamic-switch control unit 20 is connected to the dynamic switch 10 as though it were attached to the dynamic switch by means of a port P and is available for dynamic connections like any other control unit attached to the dynamic switch 10. Through facilities provided by the dynamic-switch control unit 20, changes can be made to information in the matrix controller (to be explained) of the dynamic switch 10 concerning an individual port P which alters the ability of that port to be dynamically connected with another port.

Figure 2:
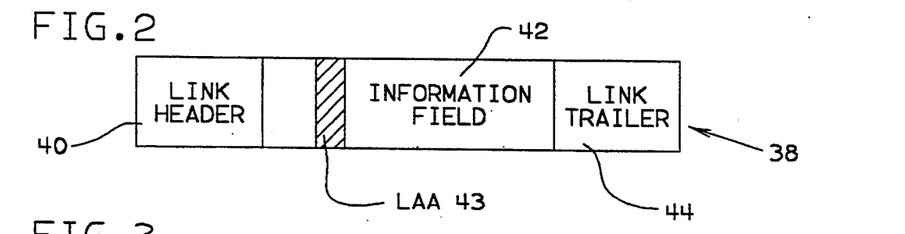
FIG. 2 is a diagrammatic representation of a frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by link-level protocols which provide for making the connection through the dynamic switch 10 and for other control functions. Each channel and each control unit contains a link-level facility, which is the embodiment of the link protocols.

Each link-level facility is assigned a unique address, called the link address. The assignment of a link-address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

The dynamic-switch control unit 20 has a link address assigned to it for the purpose of communicating with the channels and control units attached to the switch.

With the configuration of FIG. 1, contention created by two or more switch ports P receiving a frame requiring a dynamic connection to the same switch port P and its respective link is resolved by the facilities within the dynamic switch based on the conditions present. This contention is resolved, independent of whether a channel or control unit is attached to the link from each port involved. When the contention is resolved, only one of the contending ports becomes dynamically connected to the required port, while the other contending ports indicate on their respective links that a destination port-busy condition exists at the dynamic switch.

If the desired connection cannot be made, the dynamic switch 10 returns a link-control response frame containing a reason code giving the reason why the connection was not made. For example, when a switch port P receives a frame that requires a dynamic connection to a port that already has a dynamic connection with another port, the dynamic switch 10 sends a link-control frame response (referred to herein as a response frame) called a port-busy frame, including a response code which indicates that the intended destination port is busy. Similarly, when a switch port P receives a frame that requires a dynamic connection to another port, and the destination link address in that frame is not defined to the dynamic switch 10, the dynamic switch 10 sends a link control frame response called a port-reject frame, including a reason code which indicates that the frame contains an undefined destination address.

Figure 3:
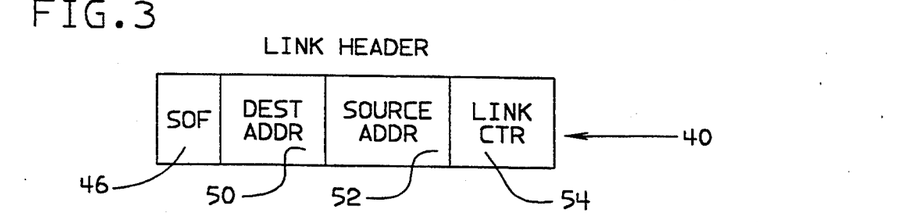
FIG. 3 is a diagrammatic representation of a link header of the frame of FIG. 2.
Figure 4:
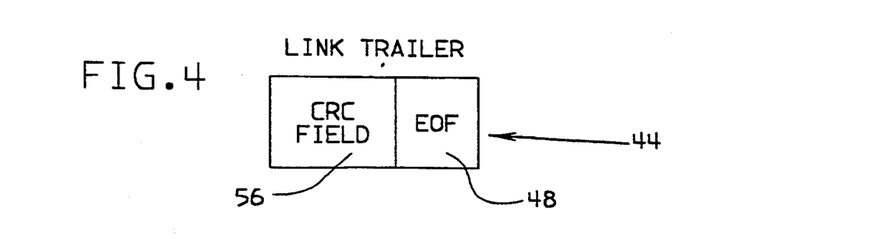
FIG. 4 is a diagrammatic representation of a link trailer of the frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent eight-bit data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, assigned by the assignee of the present invention and incorporated herein by reference. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame of future request frames to the same link-level facility.

The link-control field 54 indicates the type and format of the frame. The link-control field 54, which is the last field of the link header 40, immediately follows the source-address field 52. For the purposes of the present invention, the link-control field 54 indicates whether the frame is a link control frame or a device frame. When the frame is a link control frame, the link-control field 54 also indicates the function of the frame. Some of these functions are port reject, link-level reject, link-level busy, port busy, the state change notification (SCN) function of the present invention and other functions necessary to report the status for link-level facilities.

The information field 42 is the first field following the link header 40. The size of the information field depends on the function performed by the particular frame. The aforementioned reason code, for instance, is transmitted in the information field 42 of response frames. The information field 42 may be or include a link address affected (LAA) field 43 for use in the SCN frame of the present invention, as will be explained.

The link trailer 44 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific sequence of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Idle characters are sent over the links when frames are not being transmitted. These idle characters, which are special characters not having data values, maintain the links in synchronism. Sequences of special idle characters are also transmitted to provide limited communication of special commands such as unconditional-disconnect and unconditional-disconnect response. These special sequences are not part of the present invention, and will not be discussed further.

Figures 5, 6:
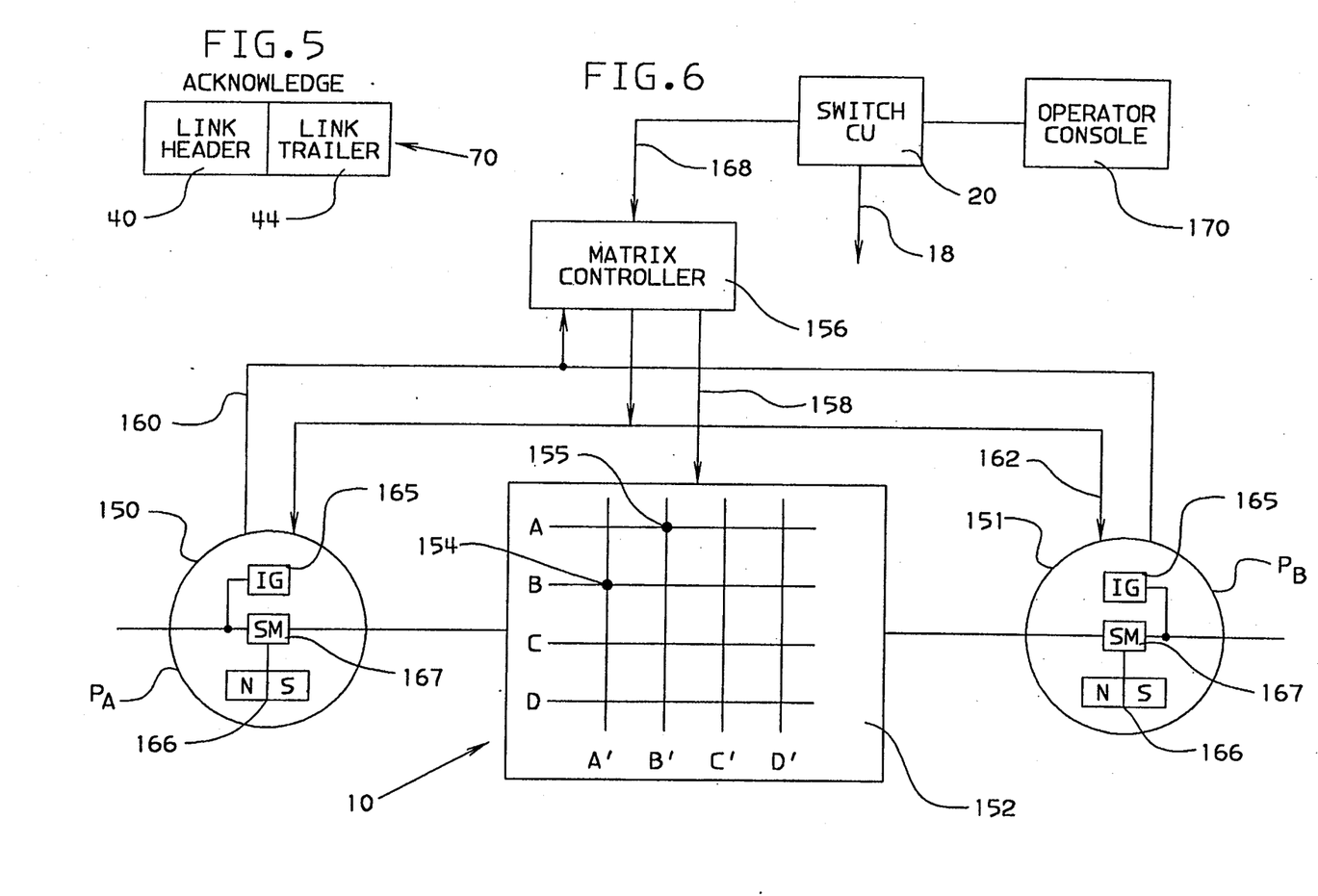
FIG. 5 is a diagrammatic representation of an acknowledge frame sent over the I/O system of FIG. 1.
FIG. 6 is a block diagram of a dynamic switch and a dynamic-switch control unit, wherein the dynamic switch has ports, a matrix, and a matrix controller.

FIG. 5 shows an acknowledge (ACK) frame 70 which is made up of the link header 40 and the link trailer 44 previously described. The ACK frame 70 does not include an information field and is used to acknowledge to a link-level facility that a previously sent frame was received without a link error. Since the ACK frame 70 includes a source address field 52, the link-level facility receiving the ACK frame 70 will know, upon receipt, which link-level facility is acknowledging receipt of the previously sent out frame. This is important in those instances in which a link-level facility sends out a frame which is addressed to no one in particular by a to-whom-it-may-concern destination address, as will be discussed further. The to-whom-it-may-concern address may be designated by placing a special character in the destination address field 50 which is a unique, recognizable character.

FIG. 6 is a block diagram of the dynamic switch 10 of FIG. 1, and includes only two dynamic-switch ports $P_A$ 150 and P$_B$ 151. The ports P$_A$ 150 and P$_B$ 151 are connected through a double sided matrix 152. The matrix 152 is made up of a plurality of parallel horizontal conductors A–D and a plurality of parallel vertical conductors A'–D'. Switches 154 and 155 at the cross-points of conductors A and B' and B and A', respectively, have been closed by initiate-connection controls to make the two way connection of the ports 150 and 151, as previously described. The actual connections of the matrix 152 are controlled by a matrix controller 156 over a matrix address output bus 158. The matrix controller 156 contains storage for storing the connections of the ports of the dynamic switch 10, the allowable connections which may be made, whether the connections are dynamic or static, and other information for the operation of the dynamic switch 10, as will be explained in connection with FIG. 1.

The matrix controller 156 is connected to the matrix 152 by the mentioned matrix address output bus 158, receives data from the ports 150 and 151 via a port input bus 160, and sends data to the ports 150 and 151 via a port output bus 162. Control signals over the bus 158 control the cross-point switches of the matrix 152, such as switches 154 and 155.

Information needed to request dynamic connections is sent by the ports P to the matrix controller via bus 160, and the matrix controller 156 responds to the ports P with information saying the requested connections are rejected or allowed, as applicable. Each port P contains storage 166 for storing a port number assigned to the port at initialization, and the port's status. Thus, the port can send a port-busy frame back to a requesting port if the source port is busy, or if the source port is not busy, inform the matrix controller 156 of a requested connection to see if the request is allowed. As will be explained, when a port P sends a request to the matrix controller 156, the port number from the storage 166 in the port P is included so that the matrix controller knows which port sent the request.

The dynamic-switch control unit 20 is connected to the matrix controller 156 by a dynamic-switch control unit input bus 168 for such purposes as making static connections in the matrix 152, blocking access to or fencing a port, and grouping ports together into partitions such that a port P may only be connected to another port in the same partition. An operator console 170 is part of the dynamic-switch control unit 20 for inputting the mentioned information, or the information may be sent to the dynamic-switch control unit 20 via the link 18, which is connected to one of the ports P of the dynamic switch 10, as discussed in connection with FIG. 1.

Each port may include an idle generator (IG) 165 which generates idle characters for transmission over the port's link, as previously described. The idle generator 165 may be constructed as described in U.S. Pat. No. 5,048,062, issued Sep. 10, 1991, entitled "Transmitting Commands Over a Serial Link", and assigned to the assignee of the present invention, which application is herein incorporated by reference. It will be understood that idle characters for transmission over the ports' link may be passed through the matrix 152 from the dynamically connected port instead of coming from the idle generator 165.

Each port determines its own state based on the state in its storage 166 and the delimiters of frames from either its link or from its dynamically connected port by means of a state machine (SM) 107 which determines the state of its port. In the preferred embodiment, the state machine 107 may be implemented in hardware, or may be implemented by microprocessor executed microcode, if desired.

Figure 7A:
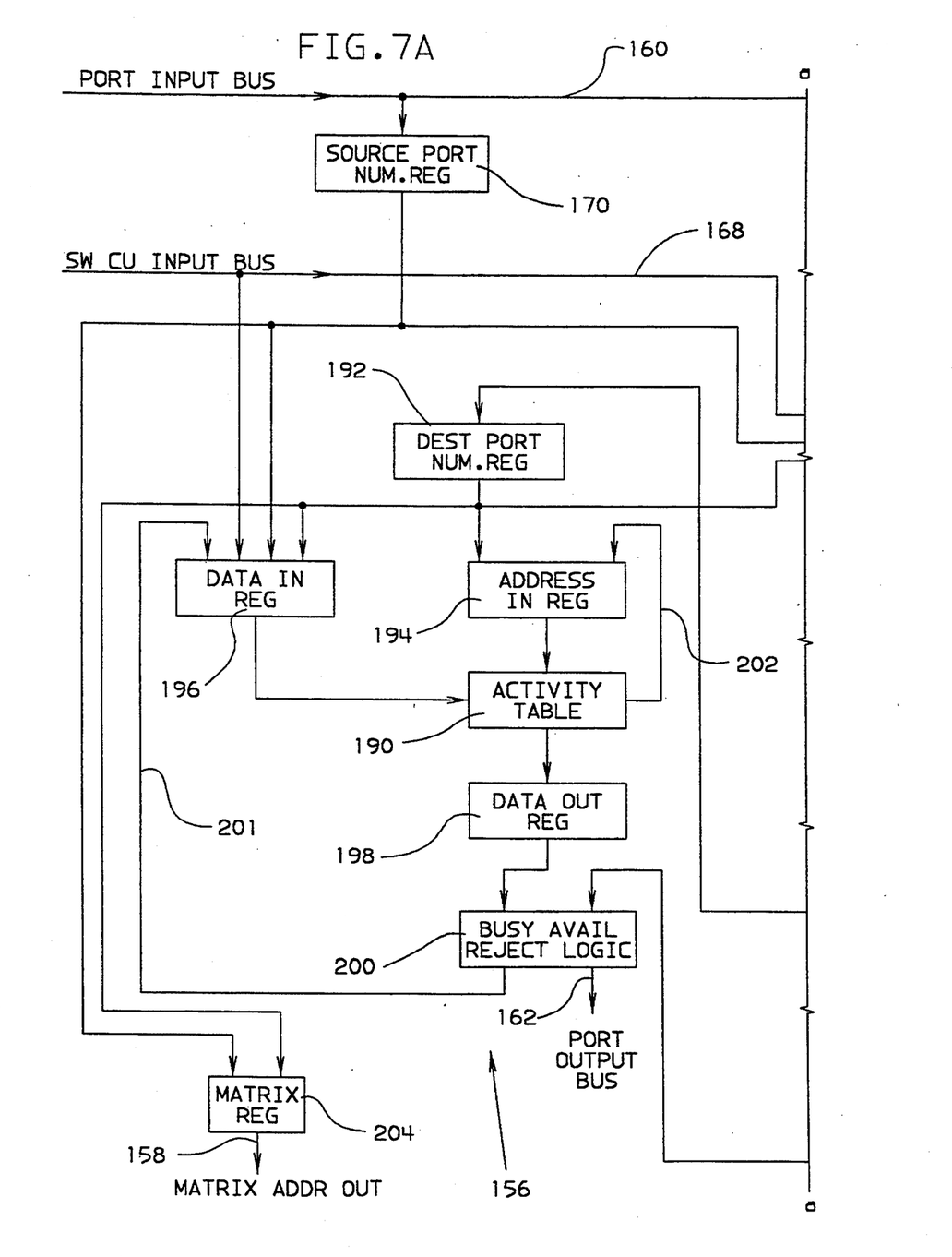
FIGS. 7a and 7b, joined along line a—a, form a block diagram of the matrix controller of FIG. 6.
Figure 7B:
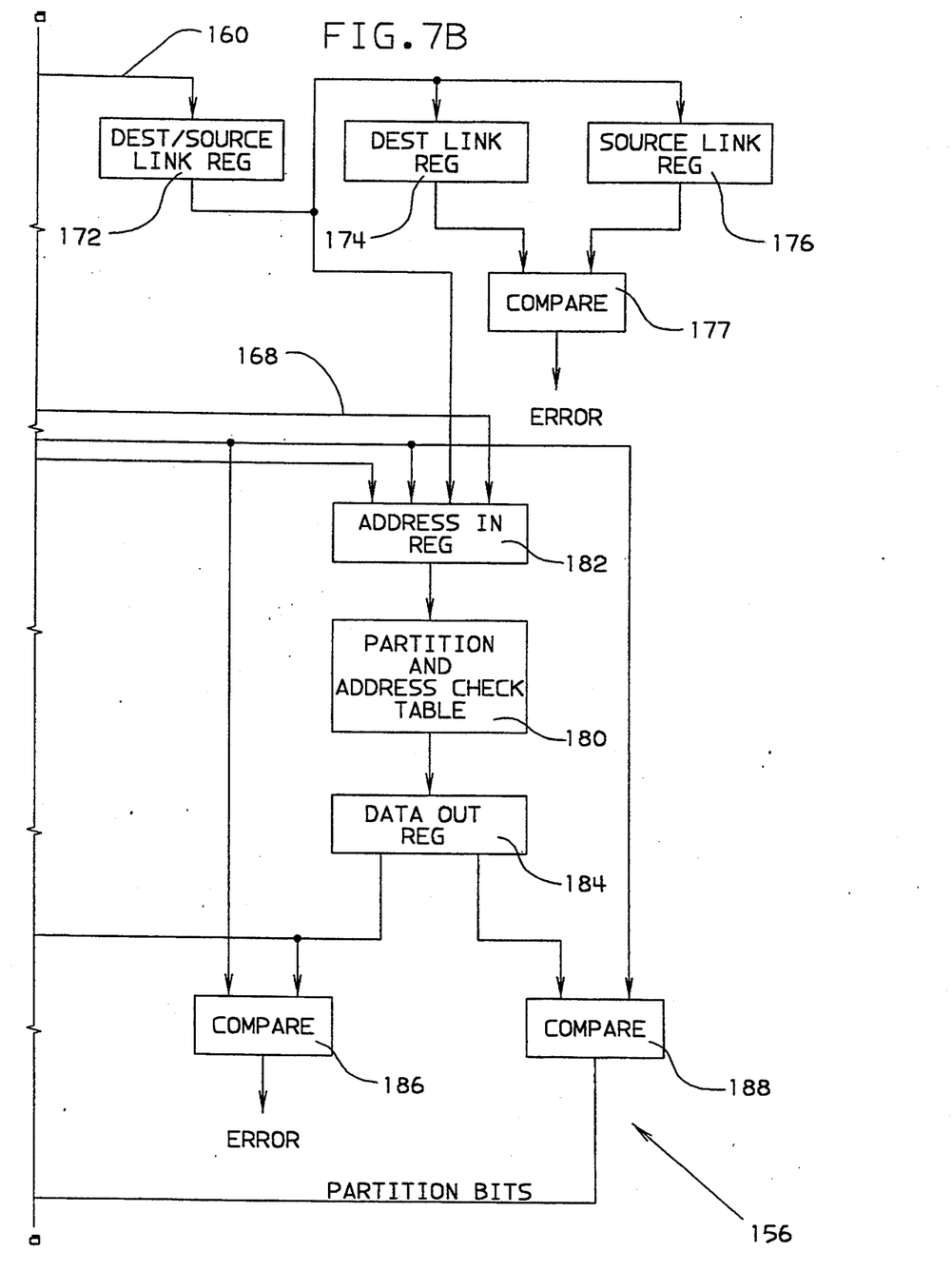

FIGS. 7A and 7B, joined along line a—a, form a block diagram of the matrix controller 156 of FIG. 6. The port input bus 160 is connected to a source port number register 170 for storing the source port number sent by the port P to the matrix controller 156. The port input bus 160 is also connected to a destination and source link register 172 for receiving and storing, in different bus cycles, the destination and source link addresses as received by the port P from fields 50 and 52 of the frame. The destination link address 50 is stored in the destination link register 174, and the source link address 52 is stored in the source link register 176, and the contents of these registers 174 and 176 are compared by a comparator 177. The comparator 177 generates an error interrupt if the destination link address is the same as the source link address.

A partition and address check table 180 provides a translation function for translating the destination and source link addresses to a port number used by the matrix controller to address the cross-point switches of the matrix 152. The partition and address check table also includes partition bits to indicate which partition, if any, the port is in. All link addresses which go into the partition and address check table 180 pass through the address in register 182, and the port data from the table 180 goes to the data-out register 184.

A comparator 186 is provided to insure that the source port number from the register 170 is the same as the port number translated by the partition and address check table 180 for the source link address from register 172. A comparator 188 is also provided to insure that the partition of the source port, which is a part of the source port number from the port input bus 160 to the register 170, is the same as the partition from the partition and address check table 180.

An activity table 190 is an addressable storage device which contains the connections of the ports P of the dynamic switch 10, and an indication if the ports are busy, their status, if the ports are unavailable such as in port fencing, and if the connection of a port is static or dynamic. The entries in the activity table 190 contain the port number and connections bits which indicate the connection data. A destination port number register 192 is connected to the data out register 184 for receiving the destination port number from the partition and address check table 180, and provides the destination port number to an address in register 194 for the activity table 190. A data in register 196 receives the port number and connection bits for storage in the activity table 190, and a data out register 198 receives data from the activity table 190 and supplies the data to busy, available and reject logic 200 along with the results of the partition comparison of comparator 188. The busy, available and reject logic 200 provides a message over the port output bus 162 to the requesting port indicating if the requested connection is allowable, or if not, if the port to which connection is requested is busy, fenced and unavailable, in the wrong partition, one port of a static connection, or in the wrong state for the requested connection. If the connection is not allowed, the information supplied by the busy, available and reject logic 200 over bus 162 is used by the source port to return a suitable response frame to the source link with the proper reason code in the information field.

Feedback paths 201 and 202 are provided to allow the activity table 190 to be modified in a read, modify, write mode. If the connection is allowed, the matrix controller makes the requested connection, and the frame is transmitted from the source port to the now connected destination port for transmission over the destination port's link.

The address in register 182 is connected to the dynamic-switch control unit input bus 168, the source port number register 170, the destination port number register 192, and the destination/source link register 172 such that the partition bits of the source and destination ports may be modified using the port number, and the destination and source link addresses may be translated to port numbers as described. The data in register 196 for the activity table 190 is connected to the dynamic-switch control unit input bus 168, the source port number register 170, and the destination port number register 192 such that modifications to the connection data and inquiries regarding the connections to the ports may be made to the activity table 190.

The source port number register 170 and the destination port number register 192 are connected to a matrix register 204, which is connected to the matrix address output bus 158 for controlling the cross-point switches of the matrix 152 of FIG. 6 if the connections are to be made or broken by the matrix controller 156.

The system of the present invention includes a state-change-notification (SCN) function which reports to the link-level facilities of a data processing system that a state change has occurred which may have affected the associations between the link-level facilities. These affected associations may include logical paths and power-control associations.

Figure 8:
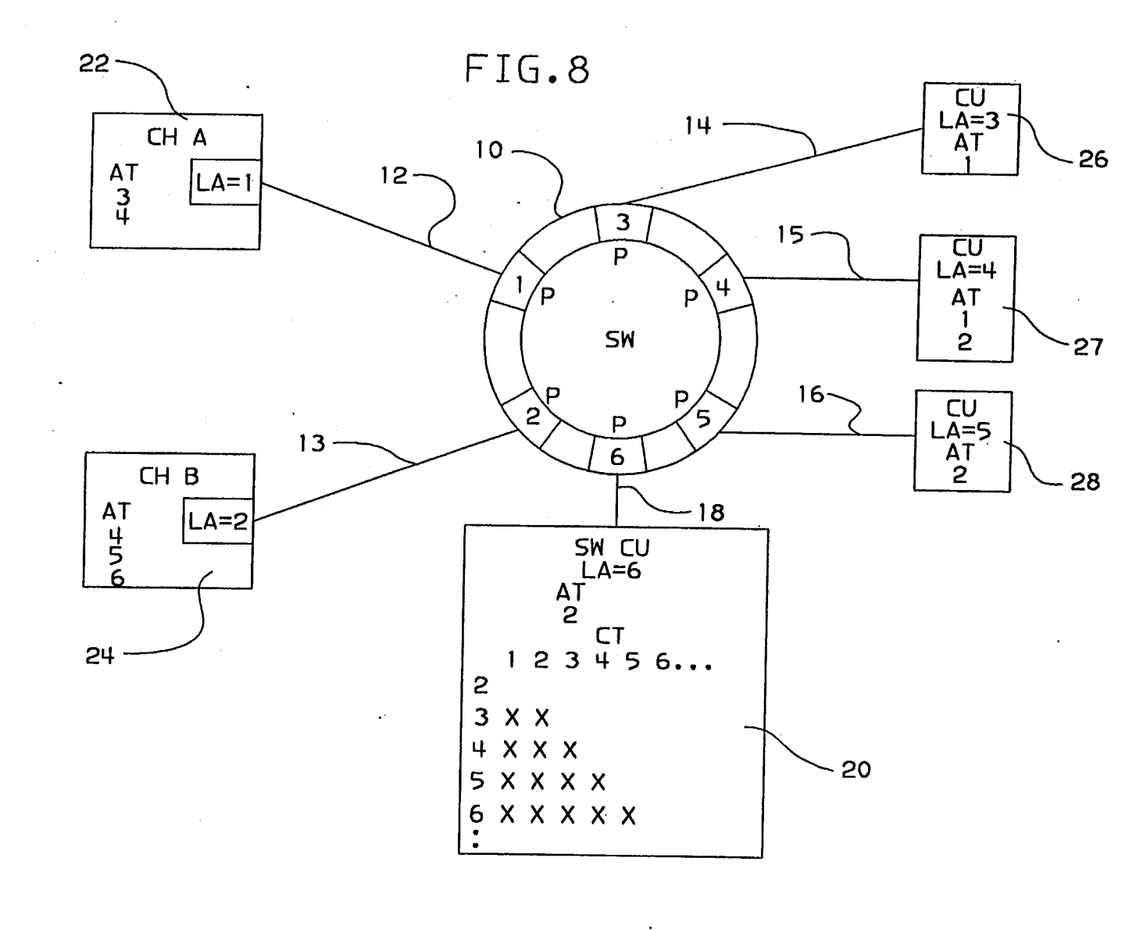
FIG. 8 is a block diagram of the I/O system of FIG. 1 wherein each channel and control unit has an attachment table, and the dynamic-switch control unit has a connection table.

Turning now to FIG. 8, a portion of the I/O system of FIG. 1 is shown which illustrates how the mentioned associations are established. As illustrated in FIG. 8, the channel 22 is given the link address of 1, and the channel 24 is given the link address 2. In the initialization process, link addresses 3, 4, 5 and 6 are assigned to control units 26, 27, 28 and dynamic-switch control unit 20, respectively. As discussed earlier, the link addresses of the link-level facilities are associated with the ports to which the link-level facilities are attached. Thus, in FIG. 8, the associated link address is shown for each port P of the switch 10.

Each of the link-level facilities in the channels 22 and 24 and the control units 26–28 has a frame generator for generating frames and transmitting them over the outbound conductor of its link, and a receiver for receiving frames from the inbound conductor of its link, and further has access to an association table (AT) in the data processing system which indicates facility-to-facility associations such as logical paths. In the example of FIG. 8, channel 22 has an association table (AT) including entries 3 and 4 for logical paths to control unit 26, link address 3, and control unit 27, link address 4. Channel 24 has an AT table including 4, 5 and 6 for logical paths to control unit 27, link address 4, control unit 28, link address 5, and dynamic-switch control unit 20, link address 6. The switch control unit 20 has access to a connection table (CT) which indicates which other ports a given port may connect with. The connection table CT of FIG. 8 is illustrated as a matrix having an "x" at each location in the lower half of the matrix where a connection might be allowed. A connection between ports is allowed if a corresponding connection is shown in the connection table CT. The connection table is kept in partition and address check table 180 of FIG. 7B. For instance, the connection table of FIG. 8 indicates that link address 3 may connect to link address 1 and 2 (row 3) and link addresses 4–6 (column 3).

Whenever the state of a port or its attached link-level facility is changed in such a way that the attached link-level facility's ability to communicate with another link-level facility might be affected, this fact is recognized by the dynamic-switch control unit 20 which causes an SCN frame to be transmitted to all of the other link-level facilities which might be affected. An ACK frame is the normal response to an SCN frame. A link-level facility which receives an SCN frame sends an ACK frame back to the originator of the SCN frame, and then determines if any of its associations or potential associations have been affected.

If an SCN frame is transmitted by a channel or a control unit, the destination address contains the to-whom-it-may-concern character and the LAA field 43 contains the link address of the affected link-level facility (usually its own link address). When the dynamic switch 10 receives an SCN frame with a to-whom-it-may-concern character in the destination address, the dynamic-switch control unit 20 returns an ACK frame of FIG. 5, and, after consulting the connection table, sends an SCN frame with the LLA field 43 containing the link address it received to each of the identified link-level facilities which are able to be connected to the affected link. Thus, the dynamic switch 10 always sends SCN frames to specific destination addresses. It will be understood that analyzing SCN frames received by the dynamic switch 10, and the sending of SCN frames by the dynamic switch 10 to the proper link addresses according to the connection table CT may be accomplished by a microcode controlled microprocessor in either the dynamic-switch control unit 20 or the matrix controller 156, as described. In the present embodiment this function is performed by a microprocessor in the dynamic-switch control unit 20.

Each of the following events will cause the microcode controlled microprocessor in the dynamic switch 10 to create initiative to report a state change on behalf of a specific link-level facility:

1. The dynamic-switch control unit 20 has received an SCN frame with a to-whom-it-may-concern destination address from that specific link-level facility.
2. That specific link-level facility is coming on line for the first time and has requested that it be assigned a link address. This typically occurs at initialization time and is disclosed in copending patent application Ser. No. 07/576,557, filed Aug. 31, 1990 entitled "Acquiring a Link Address in an I/O System".
3. The dynamic-switch port to which that specific link-level facility is attached has entered the link-failure, off-line, or static mode at a time when that link-level facility was identified with its own link address. This indicates that a link-failure has occurred in the link between the port and that specific link-level facility, or that that specific link-level facility or attached switch port has been taken out of service, or that a static connection has been made between the port connected to that specific link-level facility and another port.
4. The capability of making dynamic connections between two dynamic-switch ports is altered. This is provided by the partition function as recorded in the partition table 180 of FIG. 7B.

In the first three of these items, the dynamic-switch control unit 20 reports the state change by sending an SCN frame to each identified link-level facility attached to a port that is capable of having a dynamic connection to the port to which the link-level facility affected by the state change is attached. As previously mentioned, this is determined by the connection table CT of the dynamic switch 10.

In the last item, the dynamic-switch control unit 20 reports the state change by sending an SCN frame to the link-level facilities attached to the two affected ports, provided that both link-level facilities are identified by link addresses.

A channel or control unit may report a state change which is caused by an event which affects existing associations, or, in the case of a control unit, which affects the ability of the control unit to accept new associations.

A channel or control unit reports a state change by sending an SCN frame with either a to-whom-it-may-concern destination address or with the destination link address of a specific channel or control unit, if known. However, a channel or control unit does not issue an SCN frame if it is aware that it has already signalled a condition which would cause the dynamic switch 10, if present, to issue an SCN frame on behalf of the attached link.

If a dynamic-switch control unit 20 receives an SCN frame with a destination link address equal to its assigned link address (for instance 6 in FIG. 8) it is being informed that an association with it may have been changed. In this case, the dynamic-switch control unit 20 uses the information in the SCN frame to update its association table (AT), but does not send the SCN frame to any other link-level facility.

Once the dynamic-switch control unit 20 receives initiative to send an SCN frame to a particular link-level facility concerning a specific affected link-level facility, subsequent state changes of the affected link-level facility or dynamic-switch port do not create initiatives to send another SCN frame to that particular link-level facility if the initiative to send the first SCN frame has not been discharged. Thus, if a change of state occurs for a particular LAA, and, before the sending of the first SCN is completed, a new state change for that LAA occurs, only the first SCN is sent. This may happen, for example, when an LAA's port enters the link-failure state but returns to normal before the first SCN is sent. In this case, only one SCN is sent. Once the initiative to send the first SCN frame has been discharged, a subsequent state change creates a new initiative.

Once a channel or control unit receives initiative to send an SCN frame, subsequent state changes in that channel or control unit do not create initiatives to send another SCN frame if the initiative to send the first SCN frame has not been discharged.

Once the initiative to send the first SCN frame has been discharged, a subsequent state change creates a new initiative. If the channel or control unit is sending SCN frames with specific destination link addresses, this rule applies separately to each destination link address. If a channel or control unit receives either a busy frame or a reject frame as a response to an SCN frame, it will retry by sending another SCN frame until the initiative is discharged.

Initiative to send an SCN frame is discharged when one of the following takes place:

1. An ACK response to the SCN frame is recognized.
2. A condition is recognized for which retry of an SCN frame, if previously sent, is not performed.
3. A set number of retries, for a condition for which retry is not required to be performed indefinitely, is exhausted without success.

Figure 9:
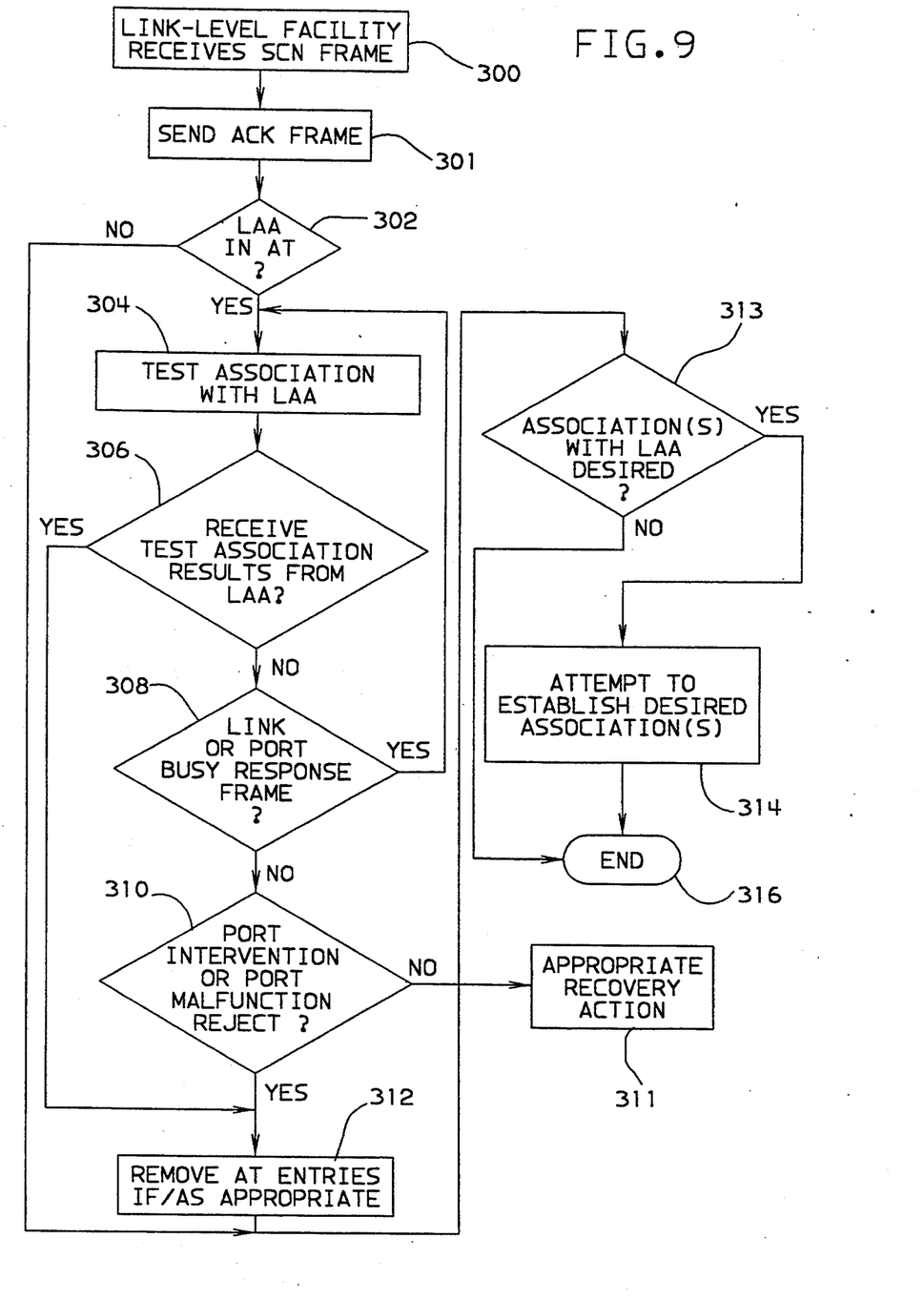
FIG. 9 is a flow chart for a routine to determine link-level facility connections in response to the receipt of a state change notification frame.

FIG. 9 is a flowchart for a link-level facility determining routine. It will be understood that the described routine is carried out by a microcode controlled microprocessor which controls the link-level facility. At 300, a receiving means in the link-level facility receives a SCN frame, as previously discussed. At 301, the link-level facility returns an ACK frame, also as discussed. A check is made at 302 to see if the LAA 43 of the SCN frame is in the association table (AT) of the link-level facility. If it is, the association is tested by sending a test initialization (TIN) frame to the LAA link address at 304. The TIN frame is similar in structure to the frame of FIG. 5 except that its start of frame delimiter is a CSOF to make a connection through the dynamic switch 10 to the affected link address reported by the SCN frame. In response to the TIN frame, the frame generator of the link-level facility addressed by the TIN frame will send back a response frame. If at 306, the response frame is received by the sender of the TIN frame, the routine goes to 312 where the results of the test are reflected in the AT, as will be discussed.

If the response frame is a link-busy frame or port-busy frame at 308, the routine returns to 304 and sends another TIN frame. If the response frame is a reject frame reporting a port intervention or port malfunction at 310, the routine goes to 312 to disable this entry in the AT to indicate that the TIN addressed link-level facility is no longer associated with the sender of the TIN frame.

If the response frame is none of the frames tested for at 306, 308 and 310, an appropriate recovery action is started at 311.

The frame returned from the TIN addressed link-level facility which reports the test association results from the LAA link address at 306 is a test initialization results (TIR) frame. The TIR frame is similar in structure to the frame of FIG. 2, and contains data in the information field 42 which indicates if the TIN addressed link-level facility continues to be associated with the sender of the TIN frame. If not, the corresponding entry in the AT is disabled at 312. The TIR frame may also contain the status of logical link addresses carried by this link.

If the LAA is not in the AT as determined at 302, the SCN may be providing initiative to add an entry into the AT. A check is made at 313 to see if any associations are desired. If yes, a frame requesting that an association be established is sent at 314 to the link-level facility having the LAA address for each desired association. If a desired association is allowed, a frame is received back affirming that the association is established. The association containing the LAA address is then added or enabled in the AT. The logical link addresses which may be used in communicating with the addressed link-level facility are contained in the affirming frame.

It will be understood that the attempt to establish desired association(s) block 314 includes provisions for link or port busy and port intervention or port malfunction tests, as previously described.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a computer I/O system including a plurality of link-level facilities and a dynamic switch having a plurality of ports, each link-level facility attached to an individual one of said ports, said dynamic switch for making point-to-point connections between any two of said ports such that communications may be established through said dynamic switch between any two link-level facilities connected to ports of the dynamic switch, each of said ports and link-level facilities being in one of several stats, some of said states affecting the ability of communication between link-level facilities, a state change notification mechanism comprising:
- a dynamic-switch control unit connected to said dynamic switch, said dynamic-switch control unit having
- a connection table means for storing a table of all the allowed connections between said link-level facilities
- a state change initiative means for creating an initiative to report a state change of specific link-level facility on behalf of said specific link-level facility, and
- a frame generator in aid dynamic switch for transmitting state change notification (SCN) frames responsive to said connection table means and said state change initiative means, one of said SCN frames being transmitted to each of said link-level facilities which has an allowed connection to said specific link-level facility in said connection table means, said frame generator comprising means for including within each of said SCN frames, an identification of said specific link-level facility on whose behalf the state change is being reported.

2. The state change notification mechanism of claim 1 wherein each link-level facility has one or more associations with other link-level facilities to which connections are allowed, each link-level facility further including
- a receiver for receiving from said dynamic switch, a SCN frame containing said identification of said specific link-level facility,
- association table means for storing a list of said associations, and
- determining association means connected to said receiver and said association table means for determining that said identification of said specific link-level facility from said SCN frame received by said receiver is stored in said association table means.

3. The state change notification mechanism of claim 2 wherein each link-level facility includes a link-level frame generator for transmitting a SCN frame to said dynamic-switch, the SCN frame having a destination address which may be one of a target destination address to be passed through said dynamic switch to the link-level facility addressed by said target destination address or a to-whom-it-may-concern destination address, said dynamic-switch control unit being connected to said dynamic switch such that said dynamic-switch control unit receives each SCN frame having said to-whom-it-may-concern address.

4. The state change notification mechanism of claim 3 wherein the state change initiative means of said dynamic-switch control unit includes means to create an initiative reporting a state change on behalf of said specific link-level facility in response to one of:
- the receipt by said dynamic-switch control unit of said SCN frame with a to-whom-it-may-concern destination address from the link-level frame generator of said specific link-level facility;
- said specific link-level facility as requested that it be assigned a link-level facility identification;
- the state of the port to which said specific link-level facility is connected changes to one of a link-failure state, an off-line state, or a static state; and
- said connection table has been altered such that allowed connections to said specific link-level facility are changed.

5. The state change notification mechanism of claim 4 further comprising:
- ACK sending means in each of said link-level frame generators for sending an ACK response frame to said dynamic-switch control unit upon receipt of one of said SCN frames from said dynamic-switch control unit;
- retry means in said dynamic-switch control unit for retrying the sending of one of said SCN frames when an ACK frame is not received responsive to the sending by said dynamic-switch control unit of a previously sent one of said SCN frames; and
- initiative discharging means in said state change initiative means for discharging said initiative to report a state change, said discharging being completed when one of the following occurs for each allowable connection to said specific link-level facility:
- the receipt by said dynamic-switch control unit of an ACK response frame in response to one of said SCN frames previously sent by said dynamic-switch control unit;
- the failure of said retry means to retry sending of one of said SCN frames by said dynamic-switch control unit; and
- exhausting without success, a set number of retries by said retry means.

6. The state change mechanism of claim 5 wherein said state change initiative means includes means for preventing the creation of a new initiative on behalf of said specific link-level facility prior to the discharging of an earlier initiative by said discharging means.

7. The state change notification mechanism of claim 4 wherein said frame generator of said dynamic switch and said link-level frame generator of each of said link-level facilities include means for inserting into transmitted-frames transmitted therefrom an identification of the source of the transmitted-frame, and wherein each of said link-level facilities further includes response means in said link-level generator for transmitting a response-frame to the source of a transmitted-frame received by said receiver, said transmitted-frames including SCN frames.

8. The state change notification mechanism of claim 7 wherein said response frame is one of
- a busy (BSY) frame indicating that the state of the link-level facility receiving said transmitted-frame is busy, or
- an acknowledgment (ACK) frame indicating that the state of the link-level facility receiving said transmitted-frame is not busy.

9. The state change notification mechanism of claim 8 wherein each of said ports includes a port receiver for receiving one of said transmitted-frames from the source identified therein, and a port frame generator for transmitting a reject (RJT) frame or a port-BSY frame to the source of said transmitted-frame, said RJT frame reporting that the state of the port receiving said transmitted-frame is one of a port intervention or a port malfunction, and said port-BSY frame reporting that the state of the port receiving said transmitted-frame is busy.

10. The state change notification mechanism of claim 9 wherein said link-level generator of each of said link-level facilities includes retry means responsive to the receipt of a port-BSY frame or a RJT frame for retrying the sending of a SCN frame to to said dynamic-switch control unit upon receipt of a port-BSY frame or a RJT frame.

11. The state change notification mechanism of claim 9 wherein each of said determining association means includes means connected to said link-level frame generator for transmitting a test initialization (TIN) frame to said specific link-level facility after transmission of said ACK frame the source of said one of said SCN frames.

12. The state change notification mechanism of claim 11 wherein each of said determining association means includes TIN retry means for transmitting an additional TIN frame to said specific link-level facility upon receipt of a BSY frame or a port-BSY frame in response to a previously sent TIN frame.

13. The state change notification mechanism of claim 11 wherein:

each of said link-level frame generators includes means for inserting into said TIN frame, an identification of the link-level facility sending the TIN frame; and each of said determining association means includes response means connected to said link-level frame generator for transmitting one of a test initiation response (TIR) frame or said BSY frame to the link-level facility identified in said TIN frame upon receipt of the TIN frame, and each of said ports include means for transmitting one of said RJT frame or said port-BSY frame to the link-level facility identified in said TIN frame upon receipt of the TIN frame.

14. The state change notification mechanism of claim 13 wherein each of said determining association means includes table altering means for deleting from said association table means, the identification of said specific link-level facility upon receipt of said RJT frame sent in response to said TIN frame, and wherein said TIR frame sent in response to said TIN frame indicates that communication has been made with said specific link-level facility.

15. In a computer I/O system including a plurality of link-level facilities and a dynamic switch having a plurality of ports, each link-level facility being attached to an individual one of said ports, said dynamic switch for making point-to-point connection between any two of said ports such that communications may be established through said dynamic switch between any two link-level facilities connected to ports of the dynamic switch, each of said ports and said link-level facilities being on one state of several states, some of said states affecting the ability of communication between link-level facilities, a method of providing a state change notification comprising:

storing in said dynamic switch, a connection table of all allowed connections between said link-level facilities wherein said allowed connections are a selected subset of all possible connections between pairs of said link-level features;

a first transmitting step comprising transmitting an initial state change notification (SCN) frame having a to-whom-it-may concern destination address from a specific link-level facility to said dynamic switch, said initial SCN frame reporting a state change in said specific link-level facility;

a second transmitting step comprising transmitting from said dynamic switch to each link-level facility having an allowed connection to said specific link-level facility as recorded in said connection table, one of subsequent SCN frames on behalf of said specific link-level facility through said dynamic switch, thereby notifying each link-level facility which may be affected by said state change in said specific link-level facility, said creating initiative step is in response to one of:

A. the receipt by a control unit controlling said dynamic switch of a SCN frame with a to-whom-it-may-concern destination address from said specific link-level facility;

B. said specific link-level facility has requested that it be assigned a link-level facility identification;

C. the port to which said specific link-level facility is attached enters one of the link-failure, off-line, or static states; and D. entries in the connection table for the interconnection of ports with the port connected to said specific link-level facility have been altered, transmitting within said second SCN frame, an identification of said specific link-level faciality on whose behalf the state change notification is being sent.

16. The method of claim 15 wherein each of said link level facilities includes an association table for storing therein a list of associated link-level facilities, said method further comprising:

storing in said association table means in one link-level facility of said link-level facilities, a list of other link-level facilities to which associations have been made on behalf of said one link-level facility, receiving at said one link-level facility, one of said SCN frames transmitted in said second transmitting step, searching the association table of said one link-level facility to determine if the identification of said specific link-level facility is stored therein, and when said identification of said specific link-level facility is found in said association table, sending an association message from said one link-level facility to said specific link-level facility for determining if there is communication between said one link-level facility and said specific link-level facility.

17. The method of 16 further comprising before said sending an association message step:

transmitting from said one link-level facility a response frame to said dynamic switch, said response frame for showing whether or not one of said SCN frames transmitted in said second transmitting step was received by said one link-level facility.

18. The method of claim 17 wherein said response frame is one of a busy (BSY) frame indicating to said dynamic switch that the state of said one link-level facility is busy, or an acknowledgment (ACK) frame indicating to said dynamic switch that the state of said one link-level facility is not busy.

19. The method of claim 18 wherein said sending of said association message includes transmitting a test initialization (TIN) frame from said one link-level facility addressed to said specific link-level facility after transmission of said ACK frame from said one link-level facility to said dynamic switch.

20. The method of claim 19 further comprising:
receiving at the one port to which said one link-level facility is attached, said TIN frame;
transmitting from said one port to said one link-level facility, a reject (RJT) frame when said one port is in a port intervention or port malfunction state, or a port-busy (port-BSY) frame when said one port is busy.

21. The method of claim 20 further comprising transmitting from said specific link-level facility, one of a test initiation response (TIR) frame or a BSY frame to the source of said TIN frame upon receipt of said TIN frame.

22. The method of claim 21 further comprising transmitting from said one link-level facility, an additional TIN frame to said specific link-level facility upon receipt by said one link-level facility of said port-BSY frame from said one port or said BSY frame from said specific link-level facility.

23. The method of claim 21 further comprising deleting the identification of said specific link-level facility upon receipt of said RJT frame, and wherein the receipt of said TIR frame indicates communication between said one link-level facility and said specific link-level facility.

* * * * *

UNITED STATES PATENT AND TRADEMARK OFFICE
CERTIFICATE OF CORRECTION

PATENT NO. : 5,423,006
DATED : June 6, 1995
INVENTOR(S) : Brown et al.

It is certified that error appears in the above-identified patent and that said Letters Patent is hereby corrected as shown below:

Column 2, line 26, "U.S. Pat. No. 4,703,487" should read --U.S. Pat. No. 4,703,478--. Column 15, line 17 (claim 1, line 23), "aid" should read --said--. Column 18, between "facility," of line 11 and "a second transmitting step" of line 12 (claim 15, between lines 24 and 25) insert --creating an initiative to report a state change on behalf of said specific link-level facility when said specific link-level facility changes from said one state; and--; and line 35 (claim 15, line 47), "second" should read --subsequent--.

Signed and Sealed this

Fourth Day of May, 1999

Attest:

Q. TODD DICKINSON

Attesting Officer

Acting Commissioner of Patents and Trademarks